Sept. 3, 1935.    E. S. PORTER    2,013,288
BINOCULAR CAMERA
Filed Oct. 8, 1932    6 Sheets-Sheet 1
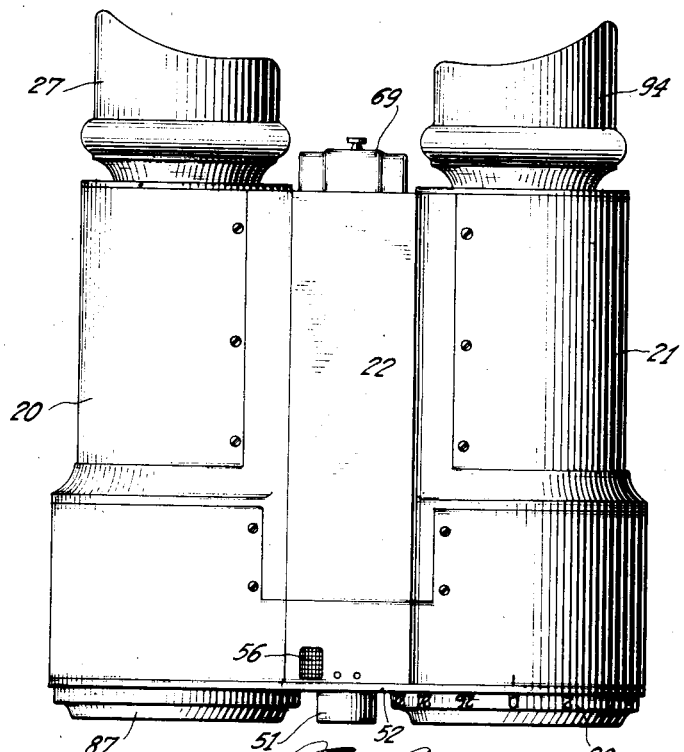
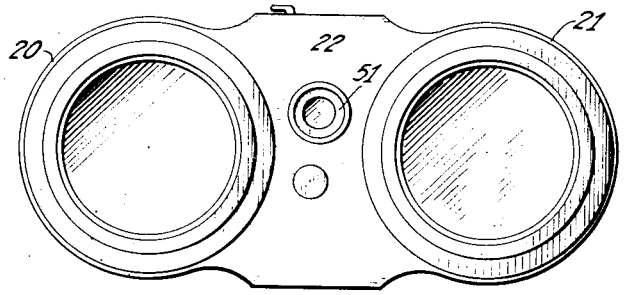
INVENTOR-
Edwin S. Porter.
BY
ATTORNEYS Sept. 3, 1935.　　　　E. S. PORTER　　　　2,013,288
BINOCULAR CAMERA
Filed Oct. 8, 1932　　　6 Sheets-Sheet 2

INVENTOR-
Edwin S. Porter.
BY
Austin & Dix
ATTORNEYS

Sept. 3, 1935.  E. S. PORTER  2,013,288
BINOCULAR CAMERA
Filed Oct. 8, 1932  6 Sheets-Sheet 3
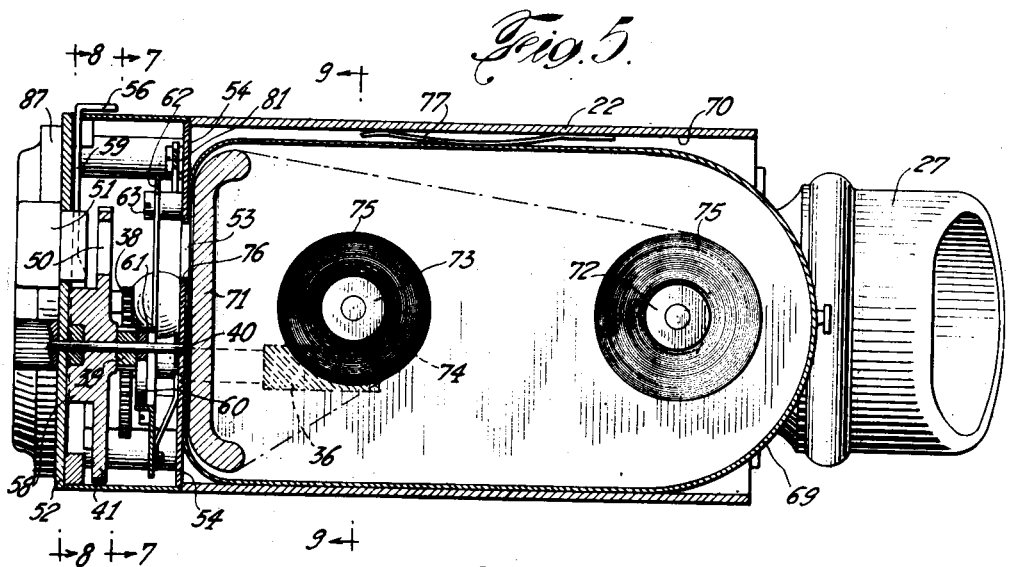
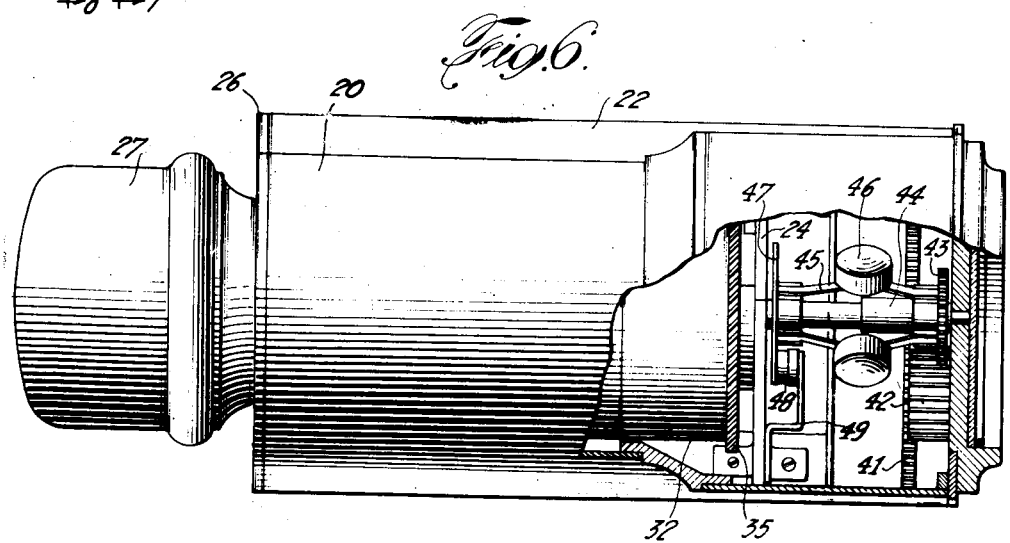
INVENTOR-
Edwin S. Porter.
BY
ATTORNEYS Sept. 3, 1935.  E. S. PORTER  2,013,288
BINOCULAR CAMERA
Filed Oct. 8, 1932  6 Sheets-Sheet 4

INVENTOR-
Edwin S. Porter.
BY
Austin & Dix
ATTORNEYS

Sept. 3, 1935.  E. S. PORTER  2,013,288
BINOCULAR CAMERA
Filed Oct. 8, 1932  6 Sheets-Sheet 5
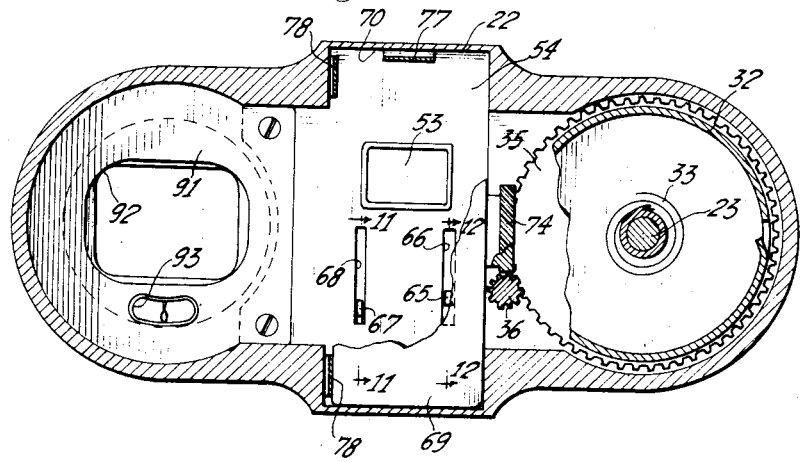
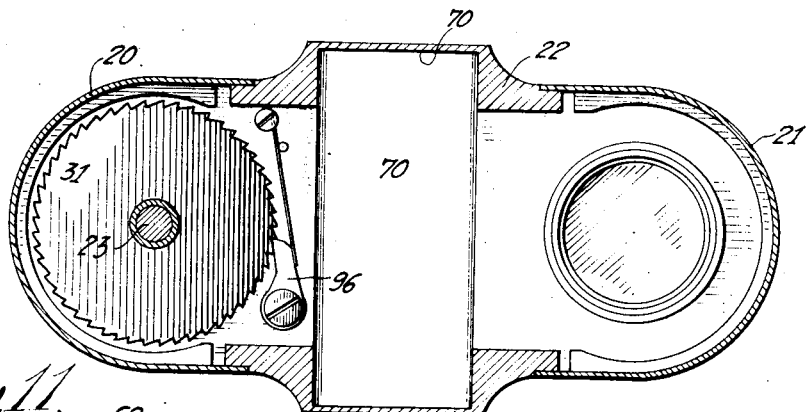
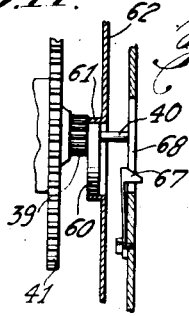
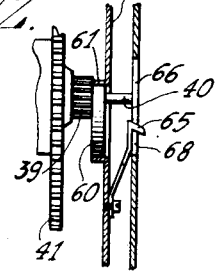
INVENTOR-
Edwin S. Porter.
BY
ATTORNEYS Sept. 3, 1935.   E. S. PORTER   2,013,288
BINOCULAR CAMERA
Filed Oct. 8, 1932   6 Sheets-Sheet 6

INVENTOR
Edwin S. Porter.
BY
Austin & Dix
ATTORNEYS

Patented Sept. 3, 1935

2,013,288

UNITED STATES PATENT OFFICE 2,013,288

BINOCULAR CAMERA

Edwin S. Porter, New York, N. Y.

Application October 8, 1932, Serial No. 636,845

21 Claims. (Cl. 88—16)

This invention relates to a new and useful improvement in amateur motion picture cameras and has especial reference to improvements in this type of camera whereby it can be made to simulate in appearance a pair of binoculars and can be operated, in the main, in substantially the same manner.

The invention provides a simple and efficient binocular casing which can be held to the eyes of the operator and with the manipulation of an indicator can be started and stopped to take motion pictures of an object which is observable to the operator all the time through one of the eye pieces.

The invention further provides a simple and efficient means whereby the film, the shutter, and the cooperating means can be quickly and easily set into operation as well as stopped by the manipulation of a stop lever readily accessible to the hand of the operator.

This invention also provides simple and efficient means whereby the operator with the device held to his eyes is enabled to continuously see the object being photographed and to simultaneously observe with his eye the number of feet of film that are being successively exposed.

The invention further provides simple and efficient means whereby the number of feet of film which has been exposed can be observed by a suitable indicator on the outside of the camera.

Also in this invention there is provided an improved film magazine which may be readily inserted into and removed from the binocular casing.

The invention further provides a simple and efficient means whereby the spring motor which is disposed within one of the tubes of the binocular may be wound up by turning one of the eye pieces, and whereby unwinding of the motor is prevented except through the drive of the mechanism.

An improved and simple and efficient modified form of camera is provided which can be pivotally divided into two pieces to open like a pocket book to enable a magazine to be laterally inserted into position and to permit the film to be more effectively threaded into the camera.

Further and more specific objects, features and advantages will more clearly appear from a consideration of the specification hereinafter when taken in connection with the accompanying drawings which form part of the specification and which illustrate a present preferred form of the invention.

Briefly considered, the invention comprises a camera which in outward appearance simulates a binocular casing having two associated parts preferably parallel with each other and associated together, and preferably being hinged together. In one of the tubes of the binocular camera is disposed a spring motor drive device. In the other tube is disposed suitable lens combination and indicating devices whereby the eye of the operator with the binoculars held to his eyes can see the object being photographed continuously during the photographic process and at the same time can continuously observe with his eye the number of feet being exposed. This is effected by reason of a connection between the indicator of the sighting tube and the drive of the film while the indicator is moved in proportion to the number of feet exposed. The indicator is also associated with a movable member on the outside of the camera. This movable member having graduations which also indicate the number of feet of film exposed so that this footage can be observed as well by examination of the outside casing.

The invention further includes means whereby turning of one of the eye pieces of the binocular will enable the spring motor unit in one of the tubes to be wound up and it is provided with suitable ratchet mechanism to prevent reverse movement of the eye piece.

The invention further includes means whereby the magazine in one instance can be slipped in from the back of the associated or connecting sections of the complete casing and the front wall of the magazine exposed and held frictionally in association with the usual film feeding claw and registration pin for operation of the film within the magazine in the usual manner.

The magazine is provided with suitable apertures to be aligned by insertion of the magazine with the apertures of the camera and with the rotating aperture in a shutter operated by the spring motor. The shutter unit is preferably also in the form of a disk or gear which operates a speed control centrifugal governor and the same mechanism operates an oscillatory support for the claw whereby the claw can be given the proper oscillatory movement to feed the film.

The spring motor in one of the tubes is provided with a cam device connected by suitable means to the footage indicator within the other tube so as to rotate said indicator in proportion to the motion of the motor which is also proportionate to the footage of the film.

The present preferred form of the invention is shown in the drawings of which:

Fig. 1 is a plan view of the camera;

Fig. 2 is a front elevation of the camera;

Fig. 3 is a horizontal section taken on the line 3—3 of Fig. 8;

Fig. 4 is a cross section taken on the line 4—4 of Fig. 3;

Fig. 5 is a longitudinal vertical section taken on the line 5—5 of Fig. 7;

Fig. 6 is a side elevation of the camera with a portion broken away;

Fig. 9 is a similar section taken on the line 9—9 of Fig. 5;

Fig. 10 is a vertical transverse section taken on the line 10—10 of Fig. 3;

Fig. 11 is a vertical longitudinal section taken on the line 11—11 of Fig. 9;

Fig. 12 is a similar section taken on the line 12—12 of Fig. 9;

Figure 7:
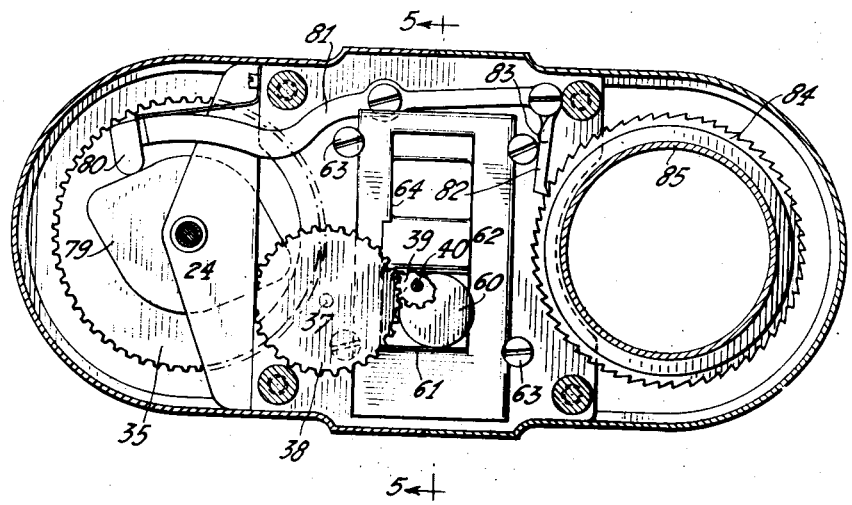
Fig. 7 is a vertical transverse section taken on the line 7—7 of Fig. 5.

In the present preferred form of the invention, it comprises a binocular form of housing having two parallel casings 20 and 21 and an intermediate connecting casing 22. In the tubular casing 20 is housed a spring motor unit; in the tubular casing 21 is housed a lens combination for sighting purposes and a footage indicator; and in the connecting casing 22 there is housed a film magazine which is readily insertable and removable with respect thereto.

*Spring motor drive*

This part of the device includes a shaft 23 journalled near one end in an upright pedestal plate 24 and at the other end in a sleeve 25 which in turn is journalled in the rear wall 26 of the camera. The artificial eye piece 27 on the rear end of the camera outside the casing is keyed to the sleeve 25 by means of the set screw 28. This sleeve 25 has on its inner end a disk 29 inside the camera casing which is frictionally connected by twist packing 30 to the inner surface of a plate 31. This plate is connected in the usual manner to a series of interconnected spring motor casings such as 32 which are serially associated to operate in the usual manner. The spring casings 32 contain the usual springs 33. The last casing 32 is connected by a pin 34 to a drive gear 35. This gear 35 meshes with a worm 36 on a shaft 37 carrying on its outer end a gear 38 meshing with a pinion 39 on a shaft 40. This shaft 40 also carries a gear 41 meshing with a gear 42, which in turn meshes with a gear 43 on a sleeve 44 rotatable on shaft 23. This sleeve is the governor sleeve and has the usual governor springs 45 and balls 46 and governor brake plate 47.

This brake plate 47 (see Fig. 6) in its movement is adapted to contact with a brake pad 48 supported on a bracket 49 from the pedestal plate 24.

*Shutter operation*

Figure 8:
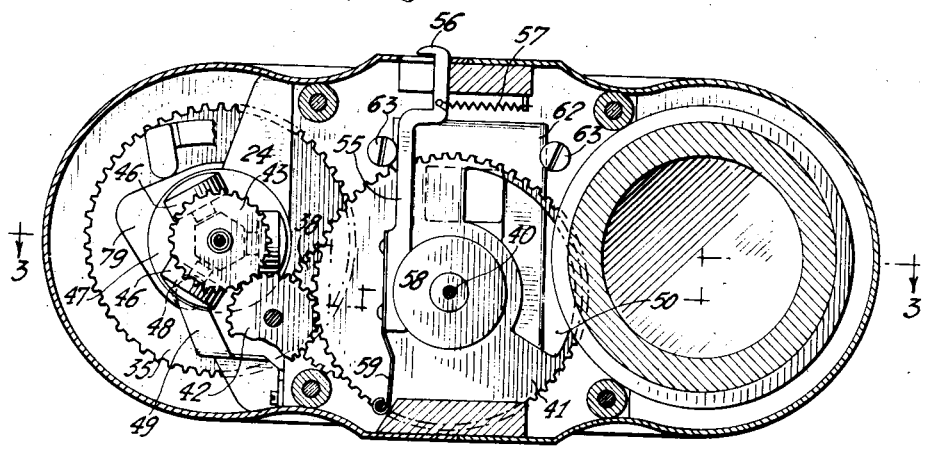
Fig. 8 is a similar section taken on the line 8—8 of Fig. 5.

The gear 41 is in the form of a disk plate having a shutter opening 50 therein. This rotates with respect to the lens combination 51 disposed on the front wall 52 of the device and with respect to a fixed aperture 53 disposed in line therewith in an intermediate wall 54 of the camera. In Fig. 8 there is seen the brake arm 55 the upper end 56 of which projects through the upper wall of the camera near the front thereof and associated with a spring 57 so that when the arm is moved against the resistance of the spring 57 the brake is taken off the hub 58 on the shutter gear 41 and the drive connection with the shutter will permit it to start in rotation. The brake arm 55 is flexibly mounted on a spring plate 59 fastened to the bottom wall of the camera. When the brake arm upper end 56 is released the spring 57 will pull it back into position to apply the brake to the hub 58 and stop the drive.

*Film drive claw operation*

The shutter shaft 40 also carries a cam 60 (see Fig. 7) rotatably housed in a flanged extension 61 on a reciprocable vertically disposed plate 62. This plate 62 is disposed (see Fig. 3) in front of the intermediate wall 54 and is restrained by guide elements such as the screws 63 along its sides. This plate 62 also has an upper opening 64 large enough not to interfere with the passage of light through the shutter opening 50 and the fixed aperture 53 in the intermediate wall 54. Near its lower end the plate 62 supports a flexible claw element 65, which is adapted to extend through a slot 66 in the wall 54 and engage the film in the usual manner to feed it downwardly. Also mounted on the wall 54 is a registration pin 67 extending through a slot 68 in the wall 54 to also engage with the film and hold it between the intervals of its engagement by the feed claw 65.

*Magazine insertion and film operation*

The magazine 69 is preferably inserted from the rear of the casing 22 into a chamber 70. This magazine has a gate plate 71, a supply film spool 72 and a take-up film spool 73 of any suitable type and the shaft of the take-up spool is connected on the outside of the magazine 69 with a drive gear 74 of the worm type and adapted to mesh with the worm 36. The film 75 is pulled off the supply spool 72 over the top of the gate plate 71 and then down past the aperture 76 in the front of the magazine which is in exact registration with the aperture 53 in the intermediate wall 54. The magazine front wall has also slots (not shown) which are in alignment with the slots 66 and 68 in the wall 54 so that the feed claw 65 and the registration pin 67 may engage the film 75 in the usual manner. Springs 77 and 78 in the chamber 70 engage the outside of the magazine 69 to hold it firmly in the chamber 70.

*Film feed indication*

Referring now to Figs. 7 and 3 there is fixed to the gear 35 a cam 79 operating a cam pawl 80 on a pivoted arm 81 the opposite end of which carries a ratchet pawl 82 actuated by a spring 83 and engaging a ratchet wheel 84 fastened to sleeve 85 journalled in the front wall 52 of the camera. This sleeve 85 also carries part of the sighting lens combination such as 86. A flange 87 of this sleeve on the outside of the camera carries graduations 88 (see Fig. 1) which indicate with respect to a zero point the number of feet of film which has been exposed. Within the sleeve 85 is also disposed an annular disk 89 on which are graduations 90 rotating with the sleeve 85. Disposed back of the sleeve is a fixed plate 91 fastened to the intermediate wall 54 and having a central large aperture 92 and a lower smaller aperture 93. The larger aperture 92 permits sighting of the object being photographed through the lenses and the lower aperture permits the eye also to see the successive graduations on the annular disk 89 as they pass and indicate to the eye the number of feet which are being exposed. The rear eye piece 94 contains the lens 95 also belonging to the object-sighting lens combination.

Spring motor wind-up

By turning the eye piece 27, the sleeve 25 and the ratchet gear 31 is also turned. A spring-pressed pawl 96 engages the ratchet gear 31 to permit movement in winding up the spring motor but preventing movement in the opposite direction, (see Fig. 10).

Modified form of camera

Figure 13:
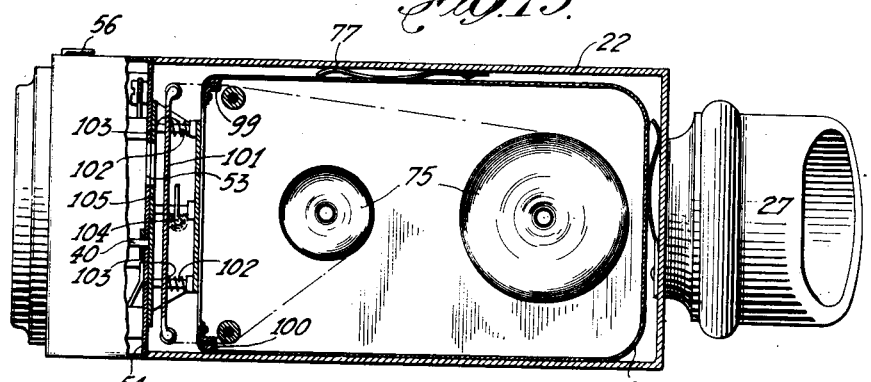
Fig. 13 is a side elevation with most of the casing broken away showing a modified form of the invention.
Figure 14:
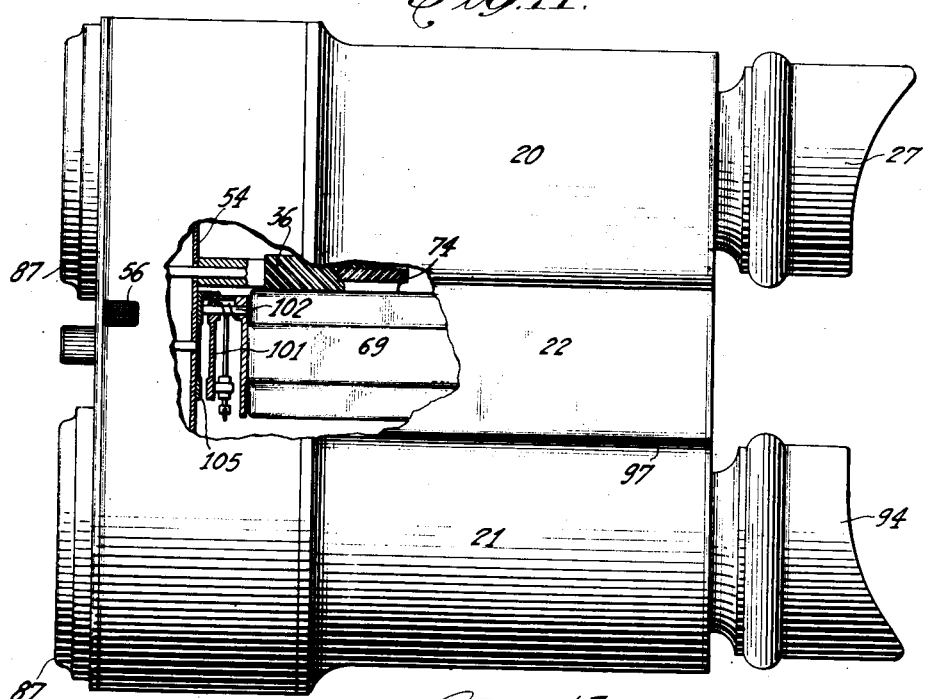
Fig. 14 is a plan view of the modified form with part of the casing broken away.
Figure 15:
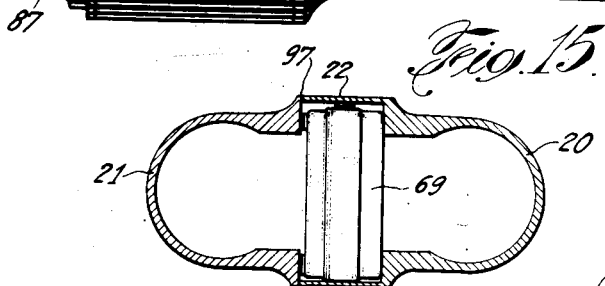
Fig. 15 is a vertical cross-section through the modified form of the camera.

Referring to Figs. 13, 14 and 15 it will be seen that the invention in most respects is similar to that just described but in this case the magazine 69 is insertable by having the camera split open down the middle and hinged on a pivot. The hinge line is preferably along the bottom as at line 98, Fig. 15, and the two portions are separated along the line 97 so that by separating them like a pocket-book the magazine 69 can then be inserted laterally into position.

In this position, the magazine is constructed substantially as before except that the film now extends out through the openings 99 and 100 at the bottom and top of the front wall and is adapted to extend over and down across a movable gate plate 101 mounted slidably on rods such as 102 and forced to the left by means of springs 103. The gate plate 101 is actuated back and forth along the rods 102 by means of a rack and lever arrangement 104. By means of this manipulating device the gate plate can be moved back and forth with respect to the wall 105 of the camera, between which and the gate plate 101 the film is held in the usual manner in its movement down across the exposure aperture.

General operation

In the operation of the device the operator turns the eye piece 27 and in so doing winds up the spring motor elements within the binocular tube 20. The ratchet 31 and pawl 96 lock these motor elements from reverse movement. The front lens unit 85 is then turned until the zero mark on the graduated scale 88 is disposed opposite the index line as seen in Fig. 1, assuming the form shown in Fig. 1. The magazine 69 is then inserted into the rear of the associated casing or housing 22 and is held in position by the springs 77—78. The slits and apertures in the magazine are aligned with the respective slits and apertures in the intermediate wall 54 and the feeding claw 65 and the registration pin 67 are in position to cooperate with the film 75. The gear 74 on the side of the magazine is in mesh with the drive gear 36.

The operator then places the binoculars to his eyes and is able to see the desired objects through the lens combinations 95 and 86 and is also able to see the zero point on the footage indicator scale or disk 89 through the opening 93 in the plate 91. He then moves the upper end of the starting lever 56 against the action of spring 57 and thereby releases the brake from the hub 58 thus permitting the power of the spring motor units to be applied to the gear mechanism previously described which will start the claw and start the disk shutter in rotation. The disk shutter having gear teeth on its outside through the mechanism above described automatically drives the centrifugal governor to keep the feed at a desired speed.

The release of the brake by operating the starting lever will cause the claw to go into operation and feed the film at predetermined speeds past the aperture opening. At the same time the cam 79 through the intermediary of the lever 81 operates the pawl 82 and the ratchet 84 to turn the front sight lens support and thereby turn the annular indicating plate 89 so that the operator can continuously see how many feet of film are being exposed. The turning of the front lens support 85 in the sighting tube also changes the relative position of the graduations 88 with respect to the index line. The operator will continue to hold his finger on the starting lever until the desired footage is exposed. Merely releasing this lever will cause the brake to be applied and the mechanism will be stopped.

After the given footage of the film is exposed, the magazine may be withdrawn from the rear of the housing 22. In the modified form of the invention, the magazine is inserted laterally as previously described after the hinged casing has been spread open like a pocket-book and the magazine inserted laterally with the film threaded over the gate plate 101.

This invention will, therefore, be seen to be a simple, compact, durable and efficient device which in outward appearance simulates a pair of binoculars. This device comprises a pair of binocular tubes one of which is used as a sight tube and the other of which is used as the housing for the driving element. The intermediate or associated casing is employed to house the magazine and the film operating shutter and mechanism as well as the speed control device. The sighting tube is employed also to retain the footage indicating device so that there is always a visual presentation of the film footage before the eye of the operator when he holds the device to his eyes.

While the invention has been described in detail and with respect to a present preferred form thereof it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. A camera which comprises a pair of binocular tubes having a spring motor unit disposed in one of said tubes and optical sighting elements disposed in the other of said tubes, a film magazine compartment between said tubes for receiving a magazine carrying film, and means extending from said motor adapted to contact with said film for driving the same after the camera has been sighted through the sighting tube.

2. A camera which comprises a pair of binocular tubes having a spring motor unit disposed in one of said tubes, said tubes having eye pieces, and means whereby the spring motor unit may be wound up by turning the eye piece associated with the tube in which the unit is disposed.

3. A camera which comprises a pair of binocular tubes, a spring motor unit disposed in one of said tubes, said tubes having eye pieces, means whereby the spring motor unit may be wound up by turning the eye piece associated with the tube in which it is disposed, and lens means in the other tube enabling the operator to continuously sight therethrough the object being photographed.

4. A camera which comprises a pair of binocular tubes, a driving unit disposed in one of said tubes, lens sighting elements disposed in the other tube, a film indicator disposed in said sighting tube, and means connecting the driving unit with the indicator to operate said indicator when the driving unit is operated whereby the operator may observe through the sighting tube the amount of film which has been exposed.

5. A camera which comprises a pair of binocular tubes, an associated housing, a driving unit in one of said tubes, optical sighting elements in the other tube, and a film magazine removably disposed in the associated housing, and means driven by the unit and associated with the magazine for driving and exposing a film in the magazine.

6. A camera which comprises a pair of binocular tubes, an intermediate connecting housing, a driving unit disposed in one of said tubes, optical sighting elements disposed in the other tube, a film magazine assembly disposed in the intermediate housing, a film feeding means, a shutter disposed within said housing and operated by said driving unit, a speed control device disposed in the tube with the driving unit, a film footage indicator disposed in the sight tube, and means connecting the driving unit with the indicator in the sight tube to move the same across the line of vision of the operator to optically denote the film footage.

7. A camera which comprises a pair of binocular tubes, a driving motor in one of said tubes, optical sighting elements in the other of said tubes, one of said elements being rotatable, an indicating element movable with said rotatable sighting element and in the line of vision of the operator looking through the sighting tube, and means connecting the driving motor with said rotatable sighting element whereby the indicating element is moved across the line of vision.

8. A camera which comprises a pair of binocular tubes, a driving motor in one of said tubes, optical sighting elements in the other of said tubes, an intermediate housing, a rotatable shutter disposed therein, a gear on said shutter, a centrifugal speed control device associated with the motor and means connecting the gear and the shutter with the speed control device.

9. A camera which comprises a pair of binocular tubes, a driving motor in one of said tubes, optical sighting elements in the other of said tubes, an intermediate housing, a rotatable shutter disposed therein, a gear on said shutter, a centrifugal speed control device associated with the motor, means connecting the gear and the shutter with the speed control device, a magazine assembly disposed within the intermediate housing, means for feeding the film through the magazine, said film feeding means being connected to the driving motor.

10. A camera which comprises a pair of binocular tubes, optical sighting elements in one of said tubes, a rotatable lens support constituting one of said elements, said support extending outside of said tube and being provided with film footage graduations on the outside of said support, a driving unit in the other of said tubes, and means connecting the driving element with the rotatable support to rotate the same.

11. A camera which comprises a pair of binocular tubes, a driving unit in one of said tubes, optical sighting elements in the other of said tubes, one of said optical elements comprising a rotatable lens support, a footage indicator disk disposed within the sighting tube and connected to said rotatable lens support, means for connecting the driving unit with the rotatable lens support, said indicating element being disposed in the path of vision of the operator looking through the sighting tube whereby the movement of the motor will move the indicating element to indicate to the operator the footage of film which has been exposed.

12. A camera which comprises a pair of binocular tubes, a plurality of optical sighting elements in one of said tubes, one of said elements comprising a rotatable lens support, said support extending outside of said tube and being provided with graduations on the outside of said support to indicate film footage, a film footage indicating disk on the inside of said tube and connected to said support for movement therewith.

13. A camera which comprises a pair of binocular tubes, a driving unit disposed in one of said tubes, an eye piece associated with each tube, means whereby the turning of one of the eye pieces effects the winding up of the driving unit, an intermediate housing connecting said tubes, a film magazine removably disposed within said housing, a gear on said magazine, a drive gear associated with said driving unit, said gear on the magazine and said gear on the driving unit automatically meshing when the magazine is inserted within the camera, film feeding mechanism associated with the drive unit and adapted to engage the film in the magazine when the latter is inserted in the housing, a rotatable shutter having an opening therein, a gear on the outside of the shutter, said shutter gear being driven by the driving unit.

14. A camera which comprises a pair of binocular tubes, driving mechanism carried at least in part in one of said tubes, optical sighting elements disposed in the other of said tubes, an intermediate housing, a film magazine removably disposed within said housing, said housing and said magazine having aligned film exposure apertures, a rotatable shutter disposed in said housing and having an opening to be aligned optically with the above mentioned apertures, a lens in the front wall of said housing, a starting lever disposed on said housing, a braking means on the starting lever engaging with a portion of said shutter to prevent movement of the mechanism when the starting lever is in its inoperative position.

15. A camera which comprises a pair of binocular tubes, a housing secured to one of said tubes, means for hingedly supporting the other of said tubes upon the housing to enable the insertion into or removal from the housing of a film magazine, and means carried at least in part within one of said tubes for driving a film in a magazine in the housing.

16. A camera which comprises a pair of binocular tubes, a driving unit in one of said tubes, optical sighting elements in the other of said tubes, an intermediate housing adapted to receive a film magazine, and means for pivotally connecting one of the tubes to the intermediate housing along a line parallel to the other tube whereby the intermediate housing may be opened up for the insertion or removal of the magazine.

17. A motion picture camera, comprising a pair of connected binocular tubes, a spring motor unit disposed in one of said tubes, optical sighting elements disposed in the other of said tubes, a housing adapted to receive a film magazine, carried by at least one of said tubes, and means operatively connected with said motor and extending into said housing and adapted to drive the film after the camera has been sighted through the sighting tube.

18. A motion picture camera, comprising a pair of binocular tubes, a spring motor unit disposed in one of said tubes, sighting elements disposed in the other of said tubes, a housing attached to at least one of said tubes, for receiving a film magazine, means operatively connected with said motor unit for driving a film in said magazine, and means for enabling the insertion of a magazine into the housing.

19. A camera, comprising a pair of binocular tubes, a driving unit disposed in one of said tubes, sighting elements disposed in the other tube, a film indicator extending into the field of vision within said sighting tube, means operatively connecting the driving unit with the indicator, and a second indicator visible from the outside of said camera and secured to the first-named indicator.

20. In a camera for taking motion pictures, in combination, a pair of eye pieces adapted to be held to the eyes, a motor unit carried in fixed relation to said eye pieces, sighting elements disposed in line with one of said eye pieces, a housing for receiving a film magazine, and means operatively connected with said motor unit for driving a film in said magazine in the housing.

21. In a camera for taking motion pictures, in combination, a pair of eye pieces adapted to be held to the eyes, a motor unit carried in fixed relation to said eye pieces, sighting elements disposed in line with one of said eye pieces, a film footage indicator disposed adjacent the line of sight through said elements, a housing for receiving a film magazine, and means operatively connected with said motor for driving a film in said magazine in the housing.

EDWIN S. PORTER.